UNITED STATES PATENT OFFICE.

ROBERT BURNS MacMULLIN, OF NIAGARA FALLS, NEW YORK, ASSIGNOR TO THE MATHIESON ALKALI WORKS, OF NEW YORK, N. Y., A CORPORATION OF VIRGINIA.

MANUFACTURE OF HYPOCHLORITES.

No Drawing. Application filed August 22, 1925. Serial No. 51,864.

This invention relates to improvements in the manufacture of basic calcium hypochlorites, and the invention includes improvements in the production of basic calcium hypochlorites as well as certain novel basic hypochlorite products.

Commercial bleaching powder is a complex composition containing a part of its chlorine as chloride chlorine and a part of its chlorine in the form of hypochlorite chlorine. When bleaching powder is dissolved in water, a solution containing calcium hypochlorite is formed. Calcium hypochlorite can not be isolated by evaporation of such a solution because molecular compounds of calcium hypochlorite with calcuim oxide and calcium chloride, originally present in the bleaching powder, are again formed. The presence of calcium chloride, which is inert as far as bleaching properties is concerned, is objectionable for the reason that it cuts down the effective bleaching value as compared with a product in which all of the chlorine is present in the form of hypochlorite chlorine and also because it decreases the stability of the bleaching powder. It has previously been proposed to prepare basic calcium hypochlorite products by precipitation with calcium hydroxide from suspensions or solutions resulting from chlorination of milk of lime, but as such solutions or suspensions contain considerable calcium chloride it has been difficult if not impossible to free the resultant product from calcium chloride. For example, it has been necessary to employ expedients such as pressing of the precipitated product under hydraulic pressure in reducing the amount of calcium chloride contained in the product.

According to the present invention, basic calcium hypochlorites are prepared by precipitation from solutions containing calcium hypochlorite but substantially free from calcium chloride. In carrying out the process of the present invention solutions containing calcium hypochlorite and substantially free from calcium chloride are prepared, for example, by treating calcium hydroxide or milk of lime with an alkyl hypochlorite and basic hypochlorites are then precipitated from this solution with calcium hydroxide. The improved basic calcium hypochlorite products of the invention are precipitated from a solution substantially free from calcium chloride and are characterized by their freedom from chlorides.

In carrying out the process of the present invention, an aqueous solution containing hypochlorous acid may be prepared by any known or suitable method, for example, by methods based upon the hydrolysis of chlorine according to the reaction

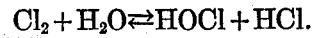

Hypochlorous acid may thus be made by adding chlorine to water in the presence of an alkaline substance, such as sodium bicarbonate or calcium carbonate, which is hydrolyzed to such an extent that it will react with hydrochloric acid formed without reacting with the hypochlorous acid. Solutions containing hypochlorous acid may also be prepared by chlorination of solutions or suspensions containing alkaline substances such as sodium carbonate, sodium hydroxide, magnesium hydroxide and hydrated lime.

The hypochlorous acid is then separated from this aqueous solution which also contains chloride chlorine by treatment with an intermediate compound which forms an extract immiscible with the aqueous solution. In United States Letters Patent No. 1,481,039, there is described, for example, a method of separating hypochlorous acid from such aqueous solutions which involves treatment of the aqueous solution with solvents or reagents which dissolve or combine with the hypochlorous acid and remove it from the solution without removing chlorides. The solvents and reagents mentioned in this patent include alcohols such as ethyl alcohol, with which the hypochlorous acid reacts to form alkyl hypochlorites. In applications filed August 22, 1925 and September 23, 1925 Serial Nos. 51,863 and 58,118 there are also described methods for the separation of hypochlorous acid from such aqueous solutions by treatment with tertiary alcohols, such as tertiary butyl alcohol to form tertiary alkyl hypochlorites. By treating such extracts of these alkyl hypochlorites with calcium hydroxide calcium hypochlorite products can be prepared which are substantially free from chloride chlorine.

In carrying out the present invention, such alkyl hypochlorites or extracts containing hypochlorite chlorine are advantageously treated with lime in the presence of sufficient water to dissolve the calcium hypochlorite formed, and this solution may then be treated with additional quantities of lime to precipitate the basic calcium hypochlorite products of the invention. In treating the extracts obtained according to the process described in the said patent, the extract may be treated with hydrated lime in the presence of water to obtain a precipitated calcium hypochlorite product, as there described, and this product may then be dissolved, or the treatment may be carried out in the presence of sufficient water to dissolve the calcium hypochlorite as formed. Likewise, in the treatment of the alkyl hypochlorites such as those described in the said applications, the treatment may be carried out in the presence of an amount of water regulated to yield a solid product which may be subsequently dissolved or the treatment may be carried out in the presence of sufficient water to dissolve the calcium hypochlorite as formed. The treatment of the alkyl hypochlorites with lime also may be carried out upon the alkyl hypochlorites themselves or upon these alkyl hypochlorites in the presence of a solvent such as additional quantities of the corresponding alcohol.

The solutions containing calcium hypochlorite so obtained are then treated with additional quantities of lime to precipitate basic calcium hypochlorites. By regulating the proportion of lime employed for precipitation, basic hypochlorite products can be obtained containing calcium hypochlorite and calcium hydroxide over a wide range of proportions. As these products are precipitated from a solution substantially free from chlorides, the product is also substantially free from chlorides and operations intended to separate calcium chloride or other chlorides from the precipitated basic calcium hypochlorite become unnecessary. The basic calcium hypochlorite products of the present invention are precipitated as hydrates and this water of hydration can be removed by drying under conditions regulated to avoid decomposition of the product, for example, by drying in a current of warm dry air free from carbon dioxide at temperatures up to say 110° C.

The invention will be further illustrated by the following example:—Tertiary butyl hypochlorite is prepared in accordance with the process described in application Serial No. 58,118 above referred to by passing 71 kgs. of chlorine into a mixture of 37 kgs. of hydrated lime, about 94 liters of tertiary butyl alcohol and about 500 liters of water while maintaining the temperature of the mixture below about 25° C. by cooling and separating the resulting butyl hypochlorite from the aqueous solution in which it is insoluble. This tertiary butyl hypochlorite is treated with a chemically equivalent quantity of hydrated lime and enough water to produce a solution of calcium hypochlorite containing about 195 grs. of $Ca(OCl)_2$ per liter. This solution is then treated with additional quantities of hydrated lime, the treatment being carried out with vigorous agitation for a period of about 20 minutes while the temperature is maintained at about 15° C., and the precipitated basic calcium hypochlorite filtered from the solution and dried in a current of air free from carbon dioxide at 110° C. for three hours. When the precipitation is carried out with about 52 parts by weight of calcium hydroxide in the treatment of a solution containing about 195 parts by weight of calcium hypochlorite a basic hypochlorite product is obtained containing the equivalent of calcium hydroxide and calcium hypochlorite in the ratio of about 1.4 to 1. When 104 parts of lime are employed with a solution containing about 195 parts of calcium hypochlorite the resultant product contains the equivalent of calcium hydroxide and calcium hypochlorite in the ratio of about 2 to 1, and with 204 parts of calcium hydroxide the ratio is about 3 to 1.

By treating tertiary butyl hypochlorite with about 2 to 3 times the chemical equivalent of hydrated lime in the presence of not more than 20 times the chemical equivalent of water, a solid product is obtained which is dry except for the alcohol regenerated by the reaction between the alkyl hypochlorite and the lime. This product is the hydrate of a mixture of basic hypochlorites. The alcohol and the water of hydration can be removed from this product by drying up to temperatures in the neighborhood of 110° C. to obtain a dry basic calcium hypochlorite product. The alcohol driven out during the hydration may be recovered and employed in the production of further quantities of the alkyl hypochlorite.

It will thus be seen that the present invention provides an improved method of producing basic calcium hypochlorite in which the basic hypochlorite is precipitated from solutions substantially free from chloride chlorine to obtain a hypochlorite product substantially free from chlorides. The solution from which the improved products are precipitated in accordance with the present invention is prepared by treating lime with alcohol hypochlorites or extracts of hypochlorite chlorine obtained by treating a solution containing both hypochlorite chlorine and chloride chlorine with a solvent or reagent which dissolves or combines with the hypochlorous acid removing it from the aqueous solution without removing the chloride chlorine, but it will be apparent that this part of the process of the invention is capable of some variation. The separation of the hypochlorous acid from such aqueous solutions containing chloride chlorine by treatment with tertiary alcohols is a particularly advantageous way of carrying out the invention due to the stability of the tertiary alkyl hypochlorites. It will also be seen that this invention provides novel basic calcium hypochlorite products which are distinguished from those previously known in their substantial freedom from chlorides, and which thus have improved stability while at the same time their entire chlorine content is available as hypochlorite chlorine. The hydrated basic calcium hypochlorite products free from chloride chlorine and precipitated substantially free from contact with chloride chlorine are also novel and are embraced with the invention.

I claim:

1. An improved method of producing basic calcium hypochlorite which comprises treating an alkyl hypochlorite with lime in the presence of water to form a solution containing calcium hypochlorite and substantially free from chlorides and precipitating the basic calcium hypochlorite from this solution with lime.

2. An improved method of producing basic calcium hypochlorite which comprises treating a tertiary alkyl hypochlorite with lime in the presence of water to form a solution containing calcium hypochlorite and substantially free from chlorides and precipitating the basic calcium hypochlorite from this solution with lime.

3. An improved method of producing basic calcium hypochlorite which comprises treating an alkyl hypochlorite with an amount of lime in excess of that chemically equivalent to the alkyl hypochlorite in the presence of substantially not more than sufficient water to hydrate the basic calcium hypochlorite formed.

4. An improved method of producing basic calcium hypochlorite which comprises treating an alkyl hypochlorite with an amount of lime in excess of that chemically equivalent to the alkyl hypochlorite in the presence of substantially not more than sufficient water to hydrate the basic calcium hypochlorite formed and dehydrating the resulting solid product.

5. An improved method of producing basic calcium hypochlorite which comprises treating an alkyl hypochlorite with about two to three times the chemical equivalent of hydrated lime in the presence of not more than about twenty times the chemical equivalent of water.

6. An improved method of producing basic calcium hypochlorite which comprises treating a tertiary alkyl hypochlorite with an amount of lime in excess of that chemically equivalent to the alkyl hypochlorite in the presence of substantially not more than sufficient water to hydrate the basic calcium hypochlorite formed.

7. An improved method of producing basic calcium hypochlorite which comprises treating a tertiary alkyl hypochlorite with an amount of lime in excess of that chemically equivalent to the alkyl hypochlorite in the presence of substantially not more than sufficient water to hydrate the basic calcium hypochlorite formed and dehydrating the resulting solid product.

8. An improved method of producing basic calcium hypochlorite which comprises treating a tertiary alkyl hypochlorite with about two to three times the chemical equivalent of hydrated lime in the presence of not more than about twenty times the chemical equivalent of water.

In testimony whereof I affix my signature.

ROBERT BURNS MacMULLIN.